US011102611B2

(12) United States Patent
Azam et al.

(10) Patent No.: US 11,102,611 B2
(45) Date of Patent: *Aug. 24, 2021

(54) TRACKING A MOBILE DEVICE (71) Applicant: Hewlett-Packard Development Company, L.P., Spring, TX (US)

(72) Inventors: Syed S. Azam, Houston, TX (US); Kent E. Biggs, Houston, TX (US); Valentin Popescu, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/249,883

(22) Filed: Jan. 16, 2019

(65) Prior Publication Data
US 2019/0149953 A1 May 16, 2019

Related U.S. Application Data (62) Division of application No. 15/520,259, filed as application No. PCT/US2014/066414 on Nov. 19, 2014, now Pat. No. 10,225,691.

(51) Int. Cl.
*H04W 4/02* (2018.01)
*H04W 4/029* (2018.01)
(Continued)

(52) U.S. Cl.
CPC ............ *H04W 4/023* (2013.01); *G06F 21/88* (2013.01); *G08B 13/1427* (2013.01); *G08B 21/0272* (2013.01); *G08B 21/0277* (2013.01); *G08B 21/24* (2013.01); *H04L 67/26* (2013.01); *H04W 4/026* (2013.01); *H04W 4/029* (2018.02); *H04W 4/80* (2018.02); *H04W 8/20* (2013.01); *H04W 88/18* (2013.01); *G06F 16/00* (2019.01);
(Continued)

(58) Field of Classification Search
None
See application file for complete search history.

(56) References Cited

U.S. PATENT DOCUMENTS 7,577,441 B2   8/2009   Nonoyarna
8,812,013 B2   8/2014   Agarwal et al.
(Continued)

FOREIGN PATENT DOCUMENTS

CN   101405777   2/2013
KR   20080021169   3/2008
(Continued)

OTHER PUBLICATIONS

Shin, H. et al., "Findingmimo: Tracing a Missing Mobile Phone Using Daily Observations"; Jun. 28, 2011-Jul. 1, 2011; 14 pages.

*Primary Examiner* — K. Wong
(74) *Attorney, Agent, or Firm* — Brooks Cameron & Huebsch PLLC (57) ABSTRACT

In an example implementation, a method of tracking a mobile device includes determining by a tracked device, that a pairing status between the tracked device and a command device has changed from a paired status to an unpaired status. A timer is started on the tracked device in response to determining the unpaired status, and in response to the timer reaching a threshold time, a distress packet is transmitted from the tracked device that indicates the tracked device is lost.

11 Claims, 7 Drawing Sheets (51) Int. Cl.

| | | |
|---|---|---|
| *H04L 29/08* | (2006.01) | |
| *G08B 13/14* | (2006.01) | |
| *G08B 21/02* | (2006.01) | |
| *G08B 21/24* | (2006.01) | |
| *H04W 4/80* | (2018.01) | |
| *G06F 21/88* | (2013.01) | |
| *H04W 8/20* | (2009.01) | |
| *H04W 88/18* | (2009.01) | |
| *G06F 16/00* | (2019.01) | |
| *H04W 84/18* | (2009.01) | |

(52) U.S. Cl.
CPC .... *G06F 2221/2143* (2013.01); *G08B 21/025* (2013.01); *G08B 21/0213* (2013.01); *G08B 21/0227* (2013.01); *G08B 21/0269* (2013.01); *H04W 84/18* (2013.01)

(56) References Cited

U.S. PATENT DOCUMENTS

| | | | |
|---|---|---|---|
| 8,847,754 B2 * | 9/2014 | Buchheim | G01S 1/68 340/539.13 |
| 9,025,769 B2 * | 5/2015 | Choi | H04W 12/06 380/247 |
| 9,060,247 B2 | 6/2015 | Yang | |
| 9,310,909 B2 | 4/2016 | Myers | |
| 9,843,900 B2 * | 12/2017 | Smith | H04W 4/029 |
| 10,062,227 B2 * | 8/2018 | Van Wiemeersch | G06Q 10/08 |
| 10,117,059 B2 * | 10/2018 | Theurer | H04W 4/029 |
| 10,225,691 B2 * | 3/2019 | Azam | H04W 4/029 |
| 10,271,171 B2 * | 4/2019 | Evans | H04W 4/21 |
| 2006/0250255 A1 | 11/2006 | Flanagan | |
| 2007/0224980 A1 | 9/2007 | Wakefield | |
| 2012/0300927 A1 | 11/2012 | Choi et al. | |
| 2013/0281130 A1 | 10/2013 | Yang et al. | |
| 2014/0135042 A1 | 5/2014 | Buchheim et al. | |
| 2014/0176475 A1 | 6/2014 | Myers et al. | |
| 2014/0329486 A1 | 11/2014 | Choi et al. | |

FOREIGN PATENT DOCUMENTS

| | | |
|---|---|---|
| TW | I280520 | 5/2007 |
| WO | WO-01/25884 | 4/2001 |
| WO | WO-2014042507 A1 | 3/2014 |

* cited by examiner

TRACKING A MOBILE DEVICE

CROSS-REFERENCE TO RELATED APPLICATIONS

This application is a divisional application of co-pending U.S. application Ser. No. 15/520259, filed Apr. 19, 2017, which itself is a national stage entry under 35 U.S.C. § 371 of PCT/US2014/066414, filed Nov. 19, 2014, each of which is incorporated by reference herein in its entirety.

BACKGROUND

As technology continues to advance, the use of mobile computing devices and related accessories has become ubiquitous. Technological advances have enabled billions of users throughout the world to benefit from the use of all manner of mobile devices. Such devices range, for example, from smart phones, media players, tablet computers, to wearable devices such as smart watches, smart eyewear, headsets, pedometers, heart monitors, containers, hand-bags, and so on. As the availability of different types of mobile devices continues to grow, more and more users own and operate multiple mobile devices.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Mobile and other computing devices have become an essential part of life for billions of users around the world. There is a significant variety of such devices ranging, for example, from smart phones, media players, tablet computers, to wearable devices such as smart watches, smart eyewear, headsets, pedometers, heart monitors, containers, hand-bags, and so on. As users continue to increase the number of mobile devices they own and operate, they are eventually confronted with the challenge of how to keep track of their multiple mobile devices. Recent statistics indicate that over 100 smartphones are lost or stolen every minute in the United States, amounting to as much as $7 million worth of smartphones per day. In 2013, 3.1 million smart phones were lost and never recovered. While the financial cost of losing such devices can be high, the loss of important information stored on a device and the potential for identity theft typically present an even greater cause for concern to many device owners.

Current methods of protecting mobile devices from loss and theft include implementing applications that track GPS-enabled devices. Such applications sometimes include additional features that allow the device owner to lock the device remotely, erase data from the device remotely, and so on. Unfortunately, in order to track a lost device, such applications usually rely on the lost device to have a continual connection to the Internet and GPS capability. The tracking of mobile devices through a constant Internet connection raises privacy concerns for device owners who may not want their every movement to be tracked on a continual basis. In addition to general privacy concerns, such tracking information can also present a danger to the device owner if accessed by the wrong person.

Accordingly, example methods and systems disclosed herein enable the tracking and location of mobile devices (and other items) once they become lost, rather than tracking them on a continual basis. The tracking and location of lost devices is achieved through a cloud-based tracking service coupled with the functionality of wireless communications technologies integrated within many mobile computing devices. The tracking solution pairs a command device with one or multiple tracked devices/items using a wireless radio communications protocol such as Bluetooth. If the pairing between the command device and a tracked device is broken for a user-defined interval of time (e.g., when the tracked device moves out of radio communication range of the command device for five minutes), the tracked device determines itself to be lost. Once lost, the tracked device broadcasts an adhoc network distress packet that indicates its status as being lost, or unpaired. The distress packet also includes the unique identity of the lost device and location information such as the current GPS location of the lost device, the GPS location of an anonymous friendly device that forwarded the distress packet, and cell tower information.

An anonymous friendly device within radio communication range of the lost device, and implementing a finder application (and/or logic) to listen for such distress packets, can detect the distress packet and forward it to a mobile device management (MDM) server. The MDM server processes and stores information from the distress packet in a lost device database (DB). Thus, the lost device DB may store unique device identifiers (UDID's) of numerous lost devices, as well as location information that can provide the last reported locations of such lost devices. Location information can include GPS information from the lost device itself, GPS information from the anonymous friendly device that forwards the distress packet, and cell tower information indicating a cell tower and sector or cell from which a distress packet was forwarded or sent. Cell tower information that comes along with a distress packet can be used to indicate the general vicinity (e.g., within several square miles) of the friendly device and the lost device. The cell tower information can indicate a pathway taken by a distress packet that indicates different cell towers that packet bounced off of on its way to the server. In some examples, where a lost device does not have GPS capability, the finder application on the friendly device can request GPS location of the friendly device to include with the distress packet. Depending on user-defined settings in the finder application, the anonymous friendly device may allow access to its GPS location to include with the distress packet being forwarded to the MDM server for storage in the lost device DB. Lost device UDID's received via distress packets and stored in the lost device DB can be matched with UDID's of mobile devices that users have previously registered with the server as being tracked devices. In response to a lost device UDID matching a tracked device UDID, the user who registered the tracked device can be notified, and provided with GPS information indicating the lost device's last reported location. When multiple distress packets are received for a lost device, and the GPS location information in each packet is different, the changing GPS location information is stored in the lost device DB in chronological order. The different GPS locations can then be used to generate a map that indicates the movement of the lost device with a path to its most recently reported location.

The disclosed tracking system and methods help to preserve the privacy of the mobile device owner. The disclosed system does not track mobile devices continually, and it does not rely on a continual connection to the Internet. Instead, the system tracks a mobile device after the mobile device has determined itself to be lost and has transmitted a distress packet. The system tracks a lost device after confirming that the lost device's UDID has been registered as a tracked device by its owner. The system also enables the use of GPS location information from both the lost device itself, and from the anonymous friendly device that detects and forwards the distress packet to the MDM server. This makes possible the tracking of lower cost devices or other items that don't have GPS circuitry and that are generally hardware-thin. An example of such a device may be a hand-bag that has an embedded wireless radio (e.g. a Bluetooth radio) to maintain a pairing with a command device, but that lacks GPS capability.

The disclosed tracking system and methods also help to maintain the anonymity of the lost devices and their owners with respect to the friendly finder devices that detect and forward the lost device distress packets to the lost device DB at the MDM server. An anonymous friendly device executing a finder application merely detects distress packets and forwards them to the MDM server, without having to know the identity of the lost device or anything else about the lost device. Furthermore, the friendly finder device remains anonymous with respect to the lost device, the owner of the lost device, and the MDM server.

In an example implementation, a method of tracking a mobile device includes determining that a pairing status between a tracked device and a command device has changed from a paired status to an unpaired status. A timer is started in response to determining the unpaired status, and in response to the timer reaching a threshold time, the tracked device transmits a distress packet that indicates the tracked device is lost. In some examples, if the pairing status changes back to a paired status from the unpaired status prior to the timer reaching the threshold time, the timer is then reset and no distress packet is transmitted.

In another example, a mobile device tracking system includes a list of users, where each user is associated with at least one UDID (unique device identifier) of a mobile device that has been registered by the user to be tracked by the system. The system also includes a lost device database (DB) to receive distress packets from lost devices that have been forwarded by anonymous friendly devices, and to store lost device UDID's and location information from within the distress packets. A finder application on the system is to match lost device UDID's from the lost device DB with tracked device UDID's. In some examples, the system can notify a user when a UDID from a lost device matches a UDID of a device the user has registered as a tracked device.

In another example, a non-transitory machine-readable storage medium stores instructions for tracking a mobile device, the instructions that when executed by a processor of a system, cause the system to receive from an anonymous device, a distress packet that comprises a lost device's unique device identifier (L-UDID) and GPS location information. The instructions further cause the system to store the L-UDID and GPS location information in a lost device database, and compare the L-UDID with tracked device unique device identifiers (T-UDIDs). In response to the L-UDID matching a T-UDID, the location of the lost device is tracked with the GPS location information.

Figure 1:
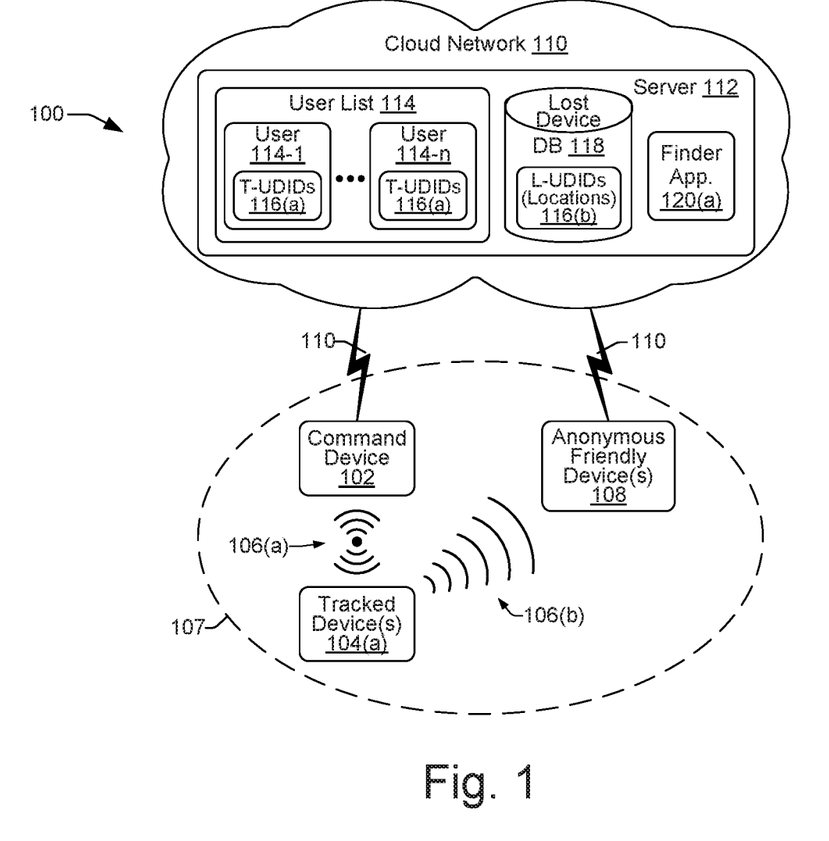
FIG. 1 shows an example of a computing environment suitable to enable the reporting, tracking, and locating of mobile devices that have been determined to be lost devices.

FIG. 1 shows an example implementation of a computing environment 100 suitable to enable the reporting, tracking, and locating of mobile devices that have been determined to be lost devices. The environment 100 includes a command device 102, one or multiple tracked devices 104(a) associated with the command device 102, an anonymous friendly device 108, and a mobile device management (MDM) server 112. Examples of a command device 102, a tracked device 104(a), and an anonymous friendly device 108, include, but are not limited to, smart phones, media players, tablet computers, smart watches, smart eyewear, headsets, pedometers, heart monitors, containers, hand-bags, and so on. Thus, command devices 102, tracked devices 104(a), and anonymous friendly devices 108, are typically implemented as a mobile device or other mobile item or object capable of implementing a wireless communication protocol 106 (illustrated as wireless radio communication protocols 106(a), 106(b)). In some examples, however, such devices may also be implemented as laptop computers, desktop computer, and other devices not generally considered to be mobile devices.

Within environment 100, a command device 102 can be paired with one or multiple tracked devices 104(a) through a wireless radio communication protocol 106(a). The command device 102 and tracked device 104(a) can be within a radio communication range 107 that enables the devices to maintain a paired status. In general, a paired status is maintained through a periodic exchange of data packets over the wireless radio communication protocol 106(a) between the command device 102 and a tracked device 104(a). For example, on a periodic basis, the tracked device 104(a) can receive a polling packet transmitted by the command device 102. Upon receiving the polling packet, the tracked device 104(a) can respond by transmitting a null packet to the command device 102. Thus, the wireless radio communication protocol 106(a) is intended to indicate a two-way communication between a command device 102 and a tracked device 104(a). While the devices remain within a radio communication range 107 of one another, the periodic transmission and receipt of data packets enables the devices to maintain a paired status. However, if the devices travel outside of radio communication range 107 of one another, the transmission and receipt of the data packets ceases, and the devices become unpaired. The devices can become paired again if they move back within radio communication range 107 and resume transmission and receipt of the data packets.

Within environment 100, an anonymous friendly device 108 can also be within a communication range 107 of a tracked device 104(a) through a wireless communication protocol 106(b). The anonymous friendly device 108 is not paired with the tracked device 104(a), but instead can be anonymous to both the tracked device 104(a) and the command device 102. As discussed below, in circumstances where the tracked device 104(a) becomes lost (i.e., unpaired from the command device 102), the friendly device can anonymously forward a distress packet from the lost device to the MDM server 112. Thus, the wireless radio communication protocol 106(b) is intended to indicate a one-way communication from a tracked device 104(a) that is lost, and an anonymous friendly device 108.

The command device 102 and anonymous friendly device 108 can be coupled through a cloud network 110 to the MDM server 112 on a continual or an intermittent basis. The network 110 is intended to represent any of a variety of conventional network topologies and types (including optical, wired and/or wireless networks), employing any of a variety of conventional network protocols (including public and/or proprietary protocols). Network 110 may include, for example, a home network, a corporate network, and the Internet, as well as one or more local area networks (LANs) and/or wide area networks (WANs) and combinations thereof.

The MDM server 112 includes a user list 114. Each user (114-1-114-*n*) in the list 114 is associated with at least one tracked device 104(*a*) through a universal device identifier (UDID), illustrated as a T-UDID 116(*a*) (i.e., a "tracked" UDID). Thus, each user in the user list 114 has at least one associated tracked device 104(*a*) registered on the server 112 through its T-UDID 116(*a*). The server 112 also includes a lost device database (DB) 118 to store lost device information that is received from anonymous friendly devices 108. Lost device information is initially transmitted within a distress packet from a lost device 104(*b*) (FIGS. 2 and 3), which can be forwarded by an anonymous friendly device 108 to the servers lost DB 118. As discussed below with respect to FIGS. 2 and 3, a lost device 104(*b*) is a tracked device 104(*a*) that has become lost. Lost device information transmitted within a distress packet includes a universal device identifier (UDID) of the lost device 104(*b*), illustrated as a L-UDID 116(*b*) (i.e., a "lost" UDID). Lost device information also includes GPS location information for a lost device 104(*b*), which comprises either GPS information from the lost device itself, or GPS information from the anonymous friendly device 108 that forwards the distress packet to the server 112. The server 112 includes a finder application 120(*a*) (and/or related logic and electronic circuitry) executable to facilitate matching L-UDID's 116(*b*) received and stored by the lost device DB 118 with T-UDID's 116(*a*) from the user list 114, and to provide GPS location information for a lost device 104(*b*) in response to a L-UDID 116(*b*) matching a T-UDID 116(*a*).

Figure 2:
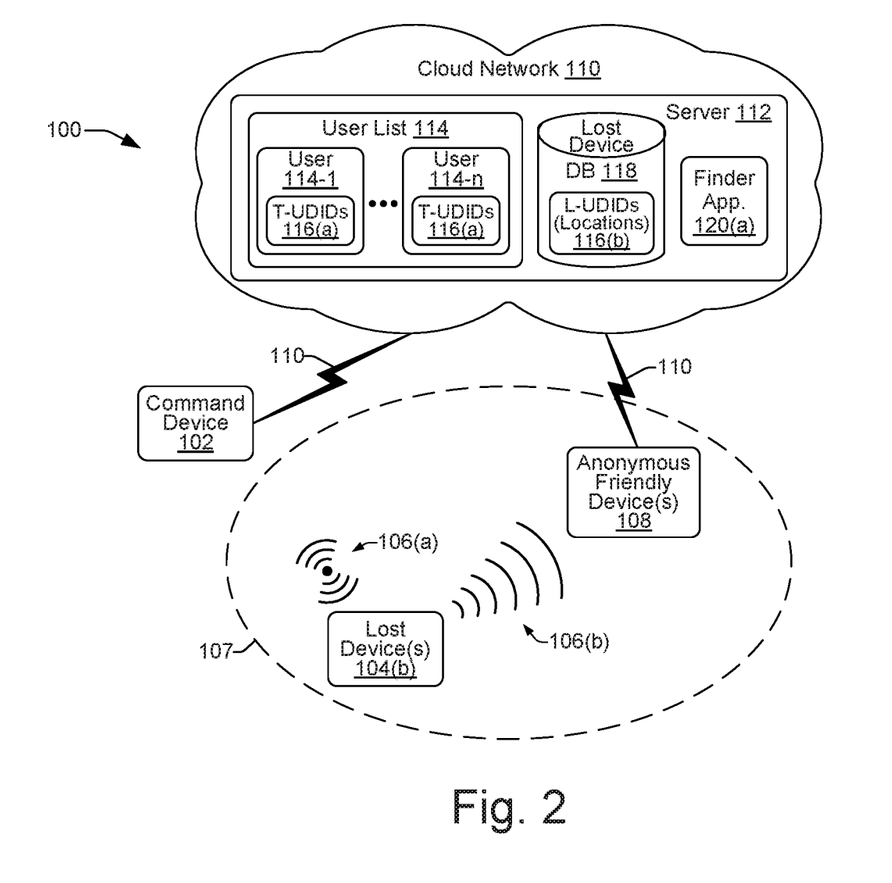
FIGS. 2 and 3 show examples of a computing environment in which a tracked device has become a lost device by virtue of being outside of a communication range of a command device.
Figure 3:
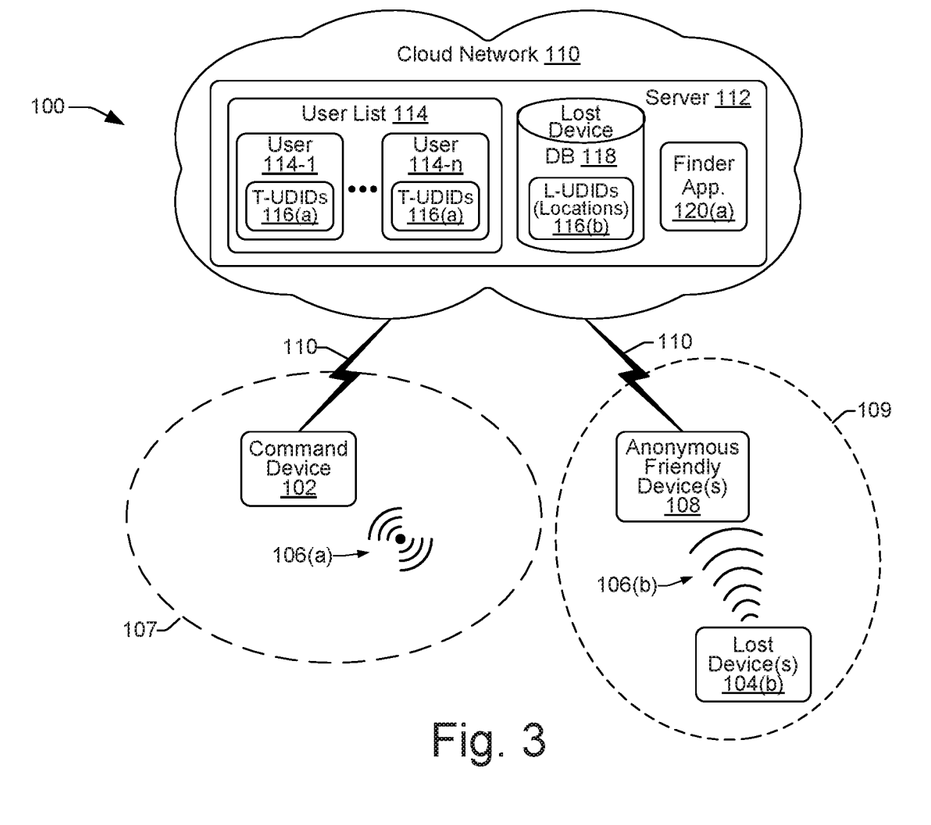

FIGS. 2 and 3 show examples of a computing environment 100 where a tracked device 104(*a*) has become a lost device 104(*b*) by virtue of being outside of the communication range 107 of its command device 102. In FIG. 2, the command device 102 has traveled outside the communication range 107 of the tracked device 104(*a*), causing the tracked device 104(*a*) to recognize that it is no longer paired with the command device 102, and that it has therefore become a lost device 104(*b*). In FIG. 3, the tracked device 104(*a*) has traveled outside the communication range 107 of the command device 102, again causing the tracked device 104(*a*) to recognize that it is no longer paired with the command device 102, and that it has therefore become a lost device 104(*b*). In both cases, it should be apparent that the tracked device 104(*a*) of FIG. 1 and the lost device 104(*b*) of FIGS. 2 and 3 are the same device, illustrated in two different circumstances. The first circumstance as shown in FIG. 1, is where the command device 102 and tracked device 104(*a*) are within the radio communication range 107 of one another. The second circumstance as shown in FIGS. 2 and 3, is where the command device 102 and lost device 104(*b*) (i.e., the tracked device 104(*a*) of FIG. 1) are outside the radio communication range 107 of one another. In both cases shown in FIGS. 2 and 3, it should be noted that the lost device 104(*b*) remains within, or has come within, a radio communication range 107 and 109, respectively, of an anonymous friendly device 108. As discussed in greater detail below, being within radio communication range of an anonymous friendly device 108, as shown in FIGS. 2 and 3, enables the tracking and location of the lost device 104(*b*) through the MDM server 112.

FIGS. 4*a*-4*d* show additional details in block diagram form of various components within an example environment 100. In some examples, the server 112 (FIG. 4*a*), command device 102 (FIG. 4*b*), tracked/lost devices 104 (FIG. 4*c*), and anonymous friendly devices 108 (FIG. 4*d*), within environment 100 can each incorporate elements of a typical computing device, such as one or more processors (CPU) 400 (respectively illustrated as CPU's 400(*a*)-400(*d*)), a memory 402 (respectively illustrated as memories 402(*a*)-402(*d*)), and various input/output (I/O) devices (not shown). A memory 402 can include both volatile (i.e., RAM) and nonvolatile (e.g., ROM, hard disk, optical disc, CD-ROM, magnetic tape, flash memory, etc.) memory components. The components of a memory 402 comprise non-transitory, machine-readable (e.g., computer/processor-readable) media that provide for the storage of machine-readable, coded programming instructions, data structures, program instruction modules, applications, and other data, such as finder applications 120 (illustrated as finder applications 120(*a*)-120(*d*)). The program instructions, applications, data structures, modules, and so on, stored in memories 402 may be part of an installation package that can be executed by processors 400 to implement various examples, such as examples discussed herein. Thus, memories 402 may comprise a portable medium such as a CD, DVD, or flash drive, or a memory maintained by a server from which the installation package can be downloaded and installed. In another example, the program instructions, data structures, and modules stored in memory 402 may be part of an application or applications already installed, in which case memory 402 may include integrated memory such as a hard drive.

Figure 4A:
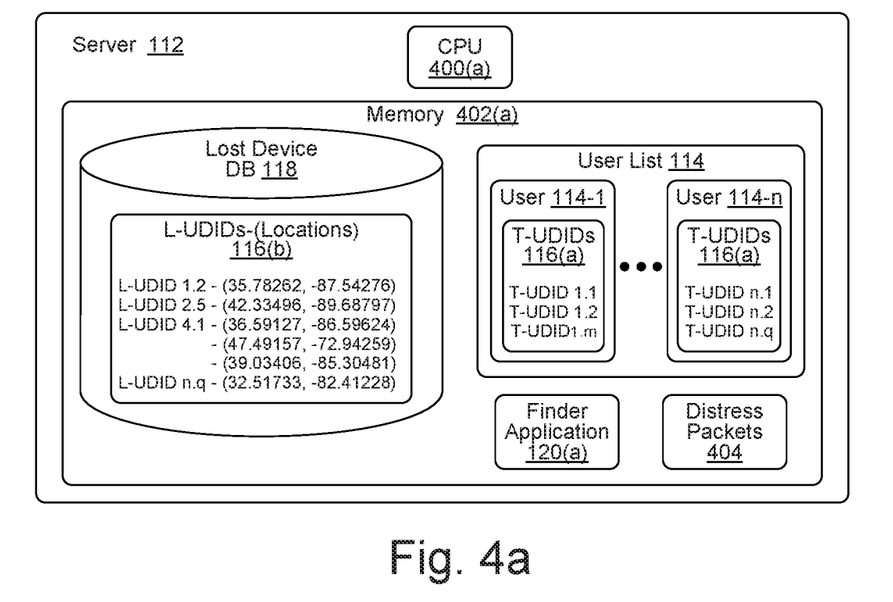
FIGS. 4a-4d show in a block diagram form, examples of details of various components within an example environment such as the computing environment of FIG. 1.

Each finder application 120(*a*)-120(*d*) comprises processor-executable instructions that facilitate various aspects of a mobile device tracking and location process. Referring to FIG. 4*a*, for example, server 112 includes finder application 120(*a*) that executes on processor 400(*a*) to enable the registration of users (114-1-114-*n*) to a user list 114. The registration of each user includes registering the user's mobile devices as tracked devices 104(*a*) on the server 112 (e.g., using a command device 102). Tracked devices 104(*a*) are mobile devices that a user wants the system to track if they become lost. Tracked devices 104(*a*) are registered on the server 112 as tracked devices by a unique device identifier, T-UDID 116(*a*). Each T-UDID 116(*a*) is associated with a corresponding user (i.e., the user that registered the T-UDID) in the user list 114.

The finder application 120(*a*) on server 112 additionally executes to receive distress packets 404, and to store information from the distress packets in the lost device DB 118. Distress packets 404 originate from a tracked device 104(*a*) that has become a lost device 104(*b*) as discussed above. Distress packets 404 from a lost device 104(*b*) are forwarded to server 112 by an anonymous friendly device 108. Each distress packet 404 includes a L-UDID 116(*b*), which comprises a unique device identifier of a tracked device 104(*a*) that has become a lost device 104(*b*). Each distress packet 404 additionally includes location information such as the GPS location of the lost device 104(*b*) at the time the packet was generated, the GPS location of an anonymous friendly device 108 that forwarded the distress packet, and cell tower information.

In some examples, where a lost device 104(b) has GPS capability, the location information can include GPS location information that originates from the lost device itself. Such GPS information provides an exact location of the lost device 104(b) at the time the distress packet is generated. In other examples, where the lost device 104(b) does not have GPS capability, the location information can include GPS location information that originates from an anonymous friendly device 108. The finder application 120(d) on the anonymous friendly device 108 can request GPS location of the friendly device to include with the distress packet. The friendly device 108 may or may not allow access to its GPS location depending on user-defined settings in the finder application 120(d). GPS information originating from an anonymous friendly device 108 provides the location of the friendly device 108 at the time the friendly device 108 detects and/or receives the distress packet from the lost device 104(b). When GPS location information originates from an anonymous friendly device 108, it can also include signal strength information from the lost device 104(b) to indicate how close the lost device 104(b) is to the friendly device 108. Thus, GPS information originating from an anonymous friendly device 108 provides an approximate location of the lost device 104(b). In other examples, where the lost device 104(b) does not have GPS capability, and the friendly device 108 does not provide GPS information, the location information can include cell tower information. The cell tower information can indicate the location of the cell tower, and a sector or cell from which a distress packet was forwarded or sent (e.g., by an anonymous friendly device). Cell tower information that comes along with a distress packet can provide an indication of the general vicinity (e.g., within several square miles) of the anonymous friendly device and the lost device. The cell tower information can also show a pathway taken by a distress packet as it bounces between different cell towers on its way to the server 112.

The finder application 120(a) executes on server 112 to store the L-UDID 116(b) and location information from each distress packet 404 in the lost device DB 118, and to compare each L-UDID 116(b) with the registered T-UDID's 116(a). As shown in FIG. 4a, the location information is illustrated as GPS coordinate information in decimal-degrees format. Other formats for GPS coordinate information can also be used. In response to a L-UDID 116(b) matching a T-UDID 116(a), the finder application 120(a) can provide a match notification and the location information to the appropriate user (114-1-114-n) from the list 114. For example, the finder application 120(a) can execute to transmit the match notification and location information to the users command device 102 via network 110. In some examples, when a plurality of distress packets 404 is received for the same L-UDID 116(b), and each packet has different GPS location information, the GPS location information is stored in the lost device DB 118 in chronological order (e.g.; as shown in FIG. 4a: L-UDID 4.1; 36.59127, −86.59624; 47.49157, −72.94259; 39.03406, −85.30481). In such circumstances, the location of the lost device 104(b) is changing, and a mapping function of the finder application 120(a) can also generate a map that indicates the path of the lost device 104(b).

Figure 4B:
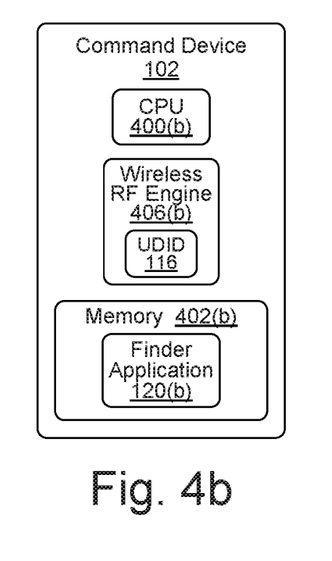
Figure 4C:
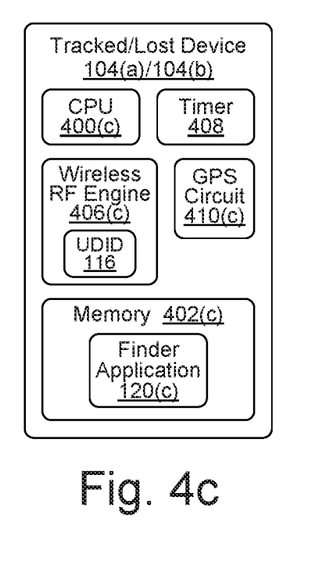
Figure 4D:
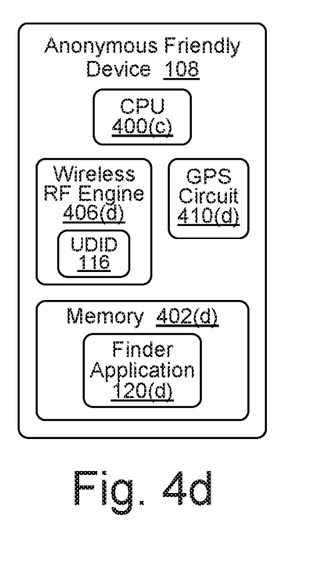

Referring to FIGS. 4b, 4c, and 4d, the command device 102, tracked device 104(a), and anonymous friendly device 108 execute finder applications 120(b), 120(c), and 120(d), respectively, to detect when a tracked device 104(a) becomes a lost device 104(b), and to facilitate the tracking and location of the lost device 104(b). When the command device 102 and tracked device 104(a) are within a radio communication range 107 (FIGS. 1-3), they can be paired in a two-way communication through a wireless radio communication protocol 106(a). In general, a wireless radio communication protocol 106 (i.e., 106(a), 106(b)) enables a device to advertise its presence by broadcasting its unique device identifier, UDID 116. Thus, the command device 102 and tracked device 104(a) can maintain a pairing with one another through the broadcasting and receiving of each other's UDIDs 116 while they are within a radio communication range 107. To this end, both the command device 102 and tracked device 104(a) incorporate a wireless radio, illustrated as wireless radio frequency (RF) engines 406 (i.e., 406(b), 406(c)), each having an associated UDID 116.

Devices may incorporate multiple types of wireless RF engines 406 to enable the detection and reading of UDIDs 116 being broadcast over a variety of wireless radio communication protocols. A wireless RF engine 406 generally comprises different hardware components such as an integrated circuit (IC) chip set and software components (i.e., processor-executable instructions) that implement a set of standards to establish radio communication between devices when the devices are brought within a certain range or proximity to one another. The types of wireless protocols implemented by the wireless RF engines 406(b) and 406(c) on a command device 102 and tracked device 104(a), respectively, enable short-range wireless communications between the devices. Examples of wireless radio communication protocols that may be suitable include, but are not limited to, Bluetooth LE (low energy), Bluetooth, Wi-Fi, Zigbee, iBeacon, and NFC.

Referring to FIGS. 4a-4d, a UDID 116 (which includes L-UDIDs 116(b) and T-UDIDs 116(a) on server 112), typically comprises a unique identifier associated with the wireless radio communication chip set. In different examples, a UDID may comprise a MAC address (media access control address), an IMEI (International Mobile Equipment Identity) ID, an IMS (International Mobile Subscriber) ID, or other unique identifier that includes, for example, some combination of information identifying the device vendor, the product number, the serial number, and so on.

When a command device 102 and a tracked device 104(a) move outside a radio communication range 107 with respect to each other, they are no longer able to maintain communication through the wireless radio communication protocol 106(a). Thus, the command device 102 and tracked device 104(a) become unpaired from one another. In an example use case, a command device may comprise a hand-bag or other suitable container in which a tracked device (e.g., a smartphone) is usually carried by a user. While the tracked device is carried within the hand-bag, the hand-bag and tracked device maintain a paired status through the wireless radio communication protocol 106(a). If the user removes the tracked device from the hand-bag and forgets to return it, and then carries the hand-bag outside of the communication range 107, the hand-bag and tracked device become unpaired. In this scenario, the finder application 120(c) on the tracked device 104(a) detects the unpaired status, and in response to the unpaired status, the finder application 120(c) initiates a timer 408. In some examples the timer 408 includes a user-defined time interval. If the command device 102 and tracked device 104(a) become paired again prior to expiration of the time interval, the finder application 120(c) resets the timer 408. However, if the time interval expires prior to the command device 102 and tracked device 104(a) becoming paired again, then the tracked device 104(a) determines that it is lost. In response to the tracked device 104(*a*) determining it is lost, it generates and broadcasts a distress packet 404 to indicate it is a lost device 104(*b*). As noted above, the distress packet 404 includes the lost device UDID 116 (i.e., L-UDID 116(*b*)), and may also include GPS location information if the lost device 104(*b*) has GPS capability. As shown in the example of FIG. 4*c*, lost device 104(*b*) has GPS capability through a GPS circuit 410(*c*).

An anonymous friendly device 108 within a radio communication range 107 can detect and receive the distress packet 404 from the lost device 104(*b*), via a wireless RF engine 406(*d*). When executing a finder application 120(*d*), the anonymous friendly device 108 can forward the distress packet 404 to server 112 for storage in lost device DB 118. In some examples, when the lost device does not have GPS circuitry 410(*c*), the distress packet 404 does not include GPS location information of the lost device 104(*b*). In such cases, the finder application 120(*d*) can request GPS location information of the anonymous friendly device 108 when the friendly device 108 is implementing GPS circuitry 410(*d*). The finder application 120(*d*) can embed GPS location information of the anonymous friendly device 108 with the distress packet 404. Upon receiving the distress packet 404, the finder application 120(*d*) can additionally determine the signal strength of the lost device 104(*b*) and include the signal strength in the distress packet 404. The signal strength of the lost device 104(*b*) seen at the friendly device 108 can provide an indication of the distance between the lost device 104(*b*) and the anonymous friendly device 108 at the time the distress packet 404 is received.

FIGS. 5, 6, 7, and 8 show flow diagrams that illustrate example methods 500, 600, 700, and 800, respectively, related to reporting, tracking, and locating mobile devices that have been determined to be lost devices. Methods 500-800 are associated with the examples discussed above with regard to FIGS. 1-4, and details of the operations shown in methods 500-800 can be found in the related discussion of such examples. The operations of methods 500-800 may be embodied as programming instructions stored on a non-transitory, machine-readable (e.g., computer/processor-readable) medium, such as the memories 402 of the various devices shown in FIG. 4. In some examples, implementing the operations of methods 500-800 can be achieved by a processor, such as a processor 400 shown in any of the various devices shown in FIG. 4, reading and executing the programming instructions stored in a memory 402. In some examples, implementing the operations of methods 500-800 can be achieved using an ASIC (application specific integrated circuit) and/or other hardware components alone or in combination with programming instructions executable by a processor 400.

Figure 6:
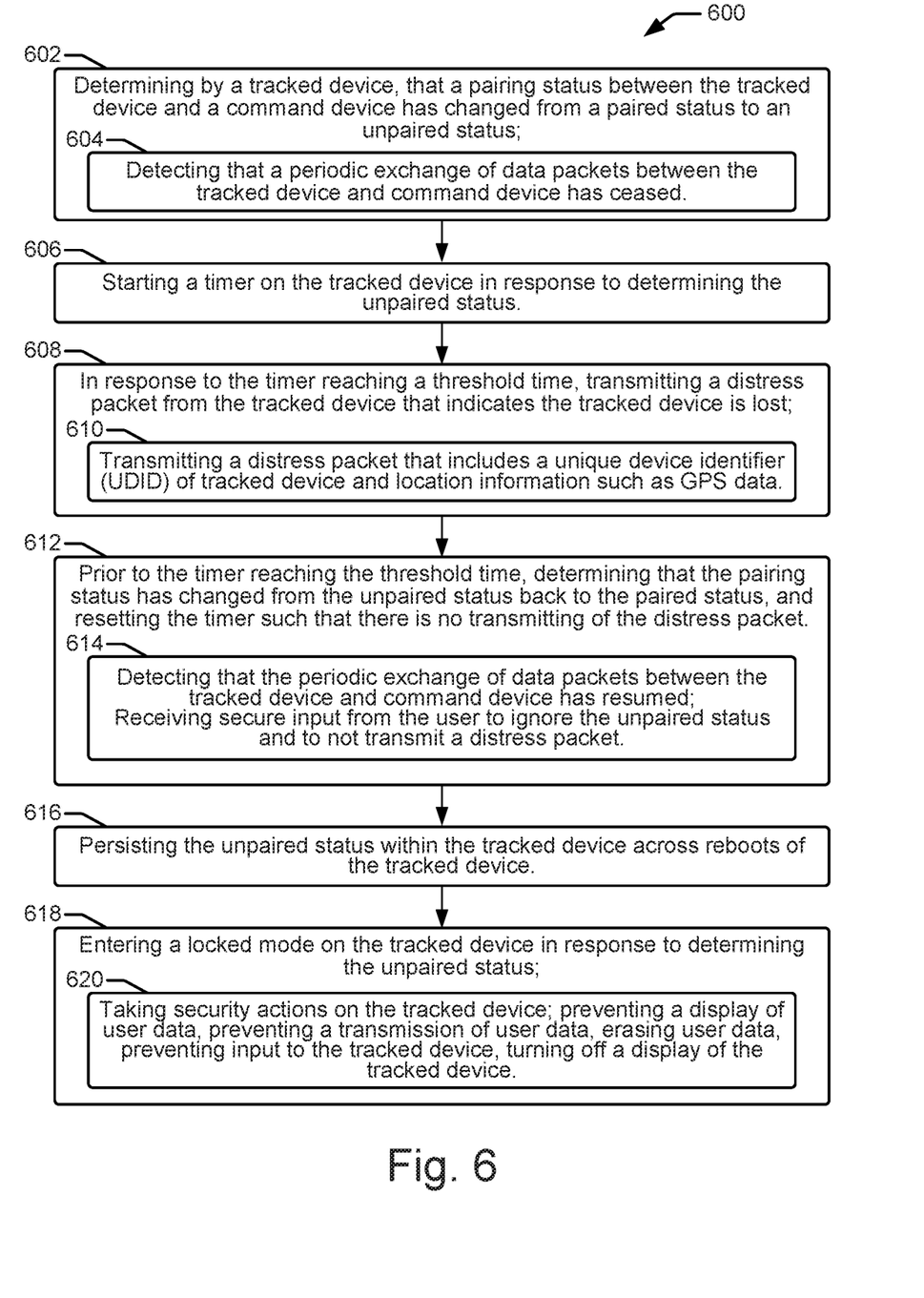

In some examples, methods 500-800 may include more than one implementation, and different implementations of methods 500-800 may not employ every operation presented in the respective flow diagrams. Therefore, while the operations of methods 500-800 are presented in a particular order within the flow diagrams, the order of their presentation is not intended to be a limitation as to the order in which the operations may actually be implemented, or as to whether all of the operations may be implemented. For example, one implementation of method 600 might be achieved through the performance of a number of initial operations, without performing one or more subsequent operations, while another implementation of method 600 might be achieved through the performance of all of the operations.

Figure 5:
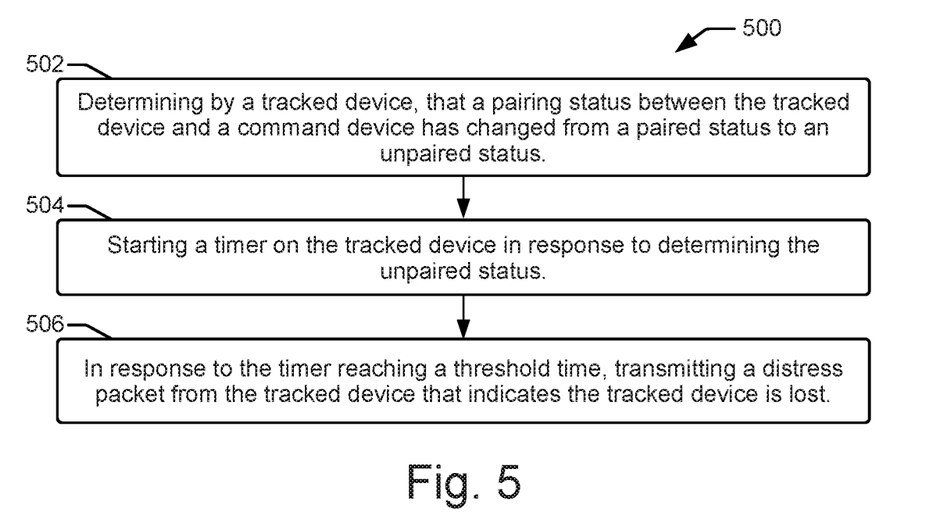
FIGS. 5, 6, 7, and 8 show flow diagrams that illustrate example methods related to reporting, tracking, and locating mobile devices that have been determined to be lost devices.

Referring now to the flow diagram of FIG. 5, an example method 500 of tracking a mobile device begins at block 502, with a tracked device determining that a pairing status between the tracked device and a command device has changed from a paired status to an unpaired status. At block 504 of method 500, a timer is initiated on the tracked device in response to determining the unpaired status. As shown at block 506, in response to the timer reaching a threshold time, a distress packet is transmitted from the tracked device that indicates the tracked device is lost.

Referring now to the flow diagram of FIG. 6, an example method 600 of tracking a mobile device extends the method 500 with additional details and steps. Method 600 begins at block 602, with a tracked device determining that a pairing status between the tracked device and a command device has changed from a paired status to an unpaired status. In some examples, as shown at block 604, determining that the pairing status has changed from a paired status to an unpaired status can include detecting that a periodic exchange of data packets between the tracked device and command device has ceased. As shown at block 606, a timer is started on the tracked device in response to determining the unpaired status. In response to the timer reaching a threshold time (such as a threshold time set by a user), a distress packet is transmitted from the tracked device that indicates the tracked device is lost, as shown at block 608. In some examples, as shown at block 610, a distress packet includes a unique device identifier (UDID) of the tracked device and location information. The location information can include, for example, GPS information from the lost device itself. As noted, in some examples, a distress packet can subsequently include other or additional location information that it picks up during its transmission to a server 112, such as location information from the anonymous friendly device, and/or cell tower information indicating a cell tower and sector or cell from which a distress packet was forwarded or sent.

In some examples, as shown at block 612, prior to the timer reaching the threshold time it can be determined that the pairing status between the tracked device and command device has changed from the unpaired status back to the paired status, and the timer can be reset so that there is no transmission of the distress packet. The change in pairing status can be determined, for example, by detecting that the periodic exchange of data packets between the tracked device and command device has resumed, as shown at block 614. In addition, in circumstances when a user intentionally unpairs the tracked device from the command device and/or finds the tracked device after it has been lost, the tracked device can receive input from the user, such as a password or other secure input, that instructs the tracked device to ignore the unpaired status and to not transmit a distress packet.

The method 600 can continue with persisting the unpaired status within the tracked device across reboots of the tracked device, as shown at block 616. Thus, the tracked device does not "forget" that it is lost if it is powered down and then powered back up. The method 600 can also include entering a locked mode on the tracked device in response to determining the unpaired status, shown at block 618. In some examples as shown at block 620, entering a locked mode can include taking security action on the tracked device that can include actions such as preventing a display of user data, preventing a transmission of user data, erasing user data, preventing input to the tracked device, turning off a display of the tracked device, and so on.

Figure 7:
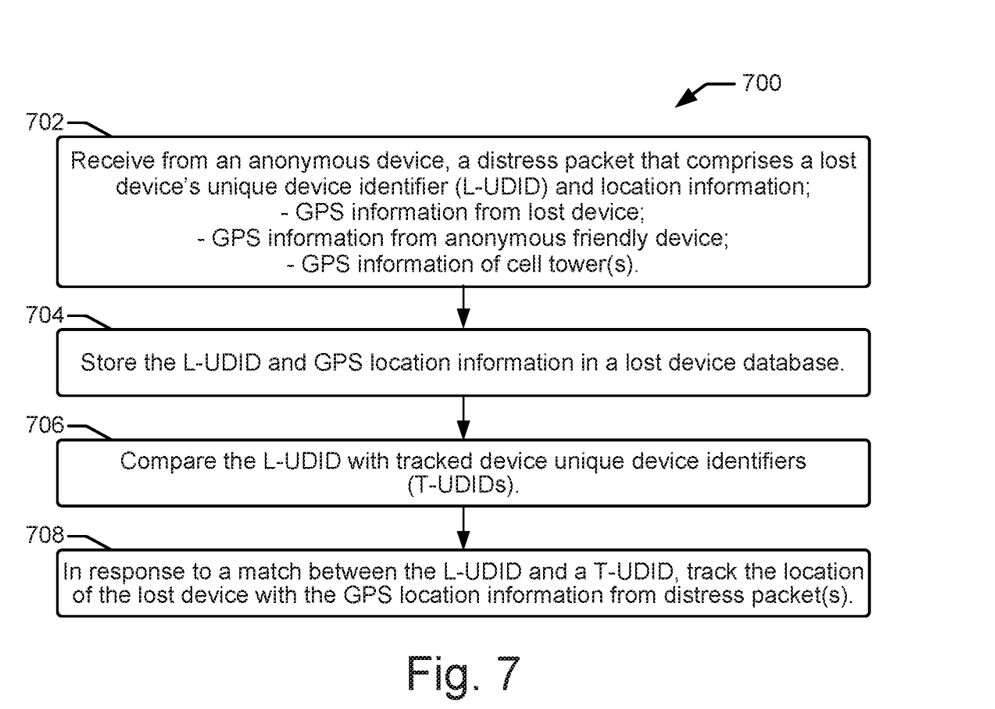

Referring now to the flow diagram of FIG. 7, an example method 700 of tracking a mobile device begins at block 702, with receiving a distress packet that comprises a lost device's unique device identifier (L-UDID) and location information. The distress packet can be received from an anonymous device such as an anonymous friendly device 108. The location information can include, for example, GPS information from the lost device itself, GPS information from the anonymous friendly device that forwards the distress packet, and/or cell tower information indicating a cell tower and sector or cell from which a distress packet was forwarded or sent. The method 700 can continue with storing the L-UDID and GPS location information in a lost device database, as shown at block 704. The L-UDID can then be compared with tracked device unique device identifiers (T-UDIDs), as shown at block 706. As noted above, T-UDIDs can be associated with specific mobile devices that a user has registered with a MDM server to have such mobile devices be tracked. As shown at block 708, in response to the comparison resulting in a match between the L-UDID and a T-UDID, the location of the lost device can be tracked using the location information from the distress packet.

Figure 8:
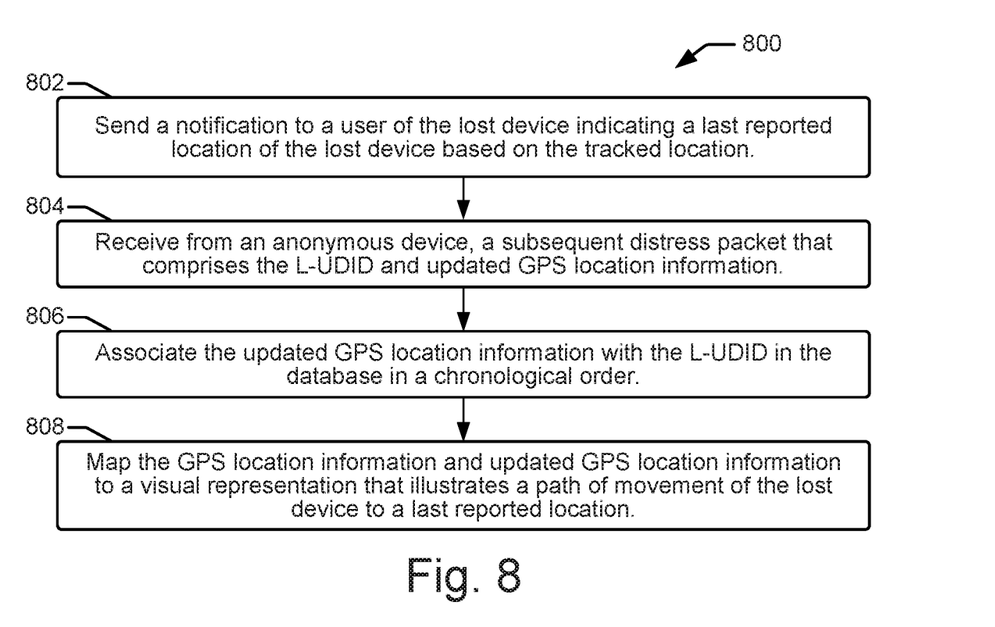

Referring now to the flow diagram of FIG. 8, an example method 800 of tracking a mobile device extends the method 700 with additional details and steps. Method 800 begins at block 802, with sending a notification to a user of the lost device that indicates a last reported location of the lost device based on the tracked GPS location. As shown at block 804, a subsequent distress packet that comprises the L-UDID (i.e., the same L-UDID) and updated GPS location information can be received from an anonymous device (e.g., from an anonymous friendly device 108). The updated GPS location information can be associated with the L-UDID in the database in a chronological order, as shown at block 806. As shown at block 808, the GPS location information and updated GPS location information can then be mapped to provide a visual representation that illustrates a path of movement of the lost device to its last reported location.

What is claimed is:

1. A method of tracking a device comprising:
   determining by the tracked device, that a wireless communication between the tracked device and a command device has changed from a paired status to an unpaired status;
   starting a timer on the tracked device in response to determining the unpaired status;
   in response to the timer reaching a threshold time, determining the tracked device is lost; and
   transmitting a distress packet from the tracked device that indicates the tracked device is lost, wherein the distress packet is transmitted in response to determining the tracked device is lost.

2. A method as in claim 1, wherein transmitting a distress packet comprises transmitting a distress packet that includes a unique device identifier (UDID) of the tracked device.

3. A method as in claim 2, wherein transmitting a distress packet comprises transmitting a distress packet that includes a GPS location of the tracked device.

4. A method as in claim 1, further comprising:
   prior to the timer reaching the threshold time, determining that the pairing status has changed from the unpaired status back to the paired status; and,
   resetting the timer in response to determining the paired status such that there is no transmitting of the distress packet.

5. A method as in claim 1, further comprising persisting the unpaired status within the tracked device across reboots of the tracked device.

6. A method as in claim 1, further comprising entering a locked mode on the tracked device in response to determining the unpaired status.

7. A method as in claim 6, wherein entering the locked mode comprises taking security actions on the tracked device, the security actions selected from the group consisting of preventing a display of user data, preventing a transmission of user data, erasing user data, preventing input to the tracked device, and turning off a display of the tracked device.

8. A method as in claim 1, wherein a paired status is maintained by a periodic exchange of data packets over a wireless radio communication protocol between the tracked device and the command device, and wherein determining that a pairing status has changed from a paired status to an unpaired status comprises detecting that the periodic exchange of data packets has ceased.

9. A method as in claim 8, further comprising determining that the pairing status has changed from the unpaired status back to the paired status by detecting that the periodic exchange of data packets has resumed.

10. A method as in claim 1, further comprising transmitting the distress packet to a mobile device management server.

11. A method as in claim 10, further comprising transmitting the distress packet to an anonymous device and forwarding the distress packet to the mobile device management server from the anonymous device.

* * * * *